INVENTOR
WILHELM WILSMAN
ATTORNEYS

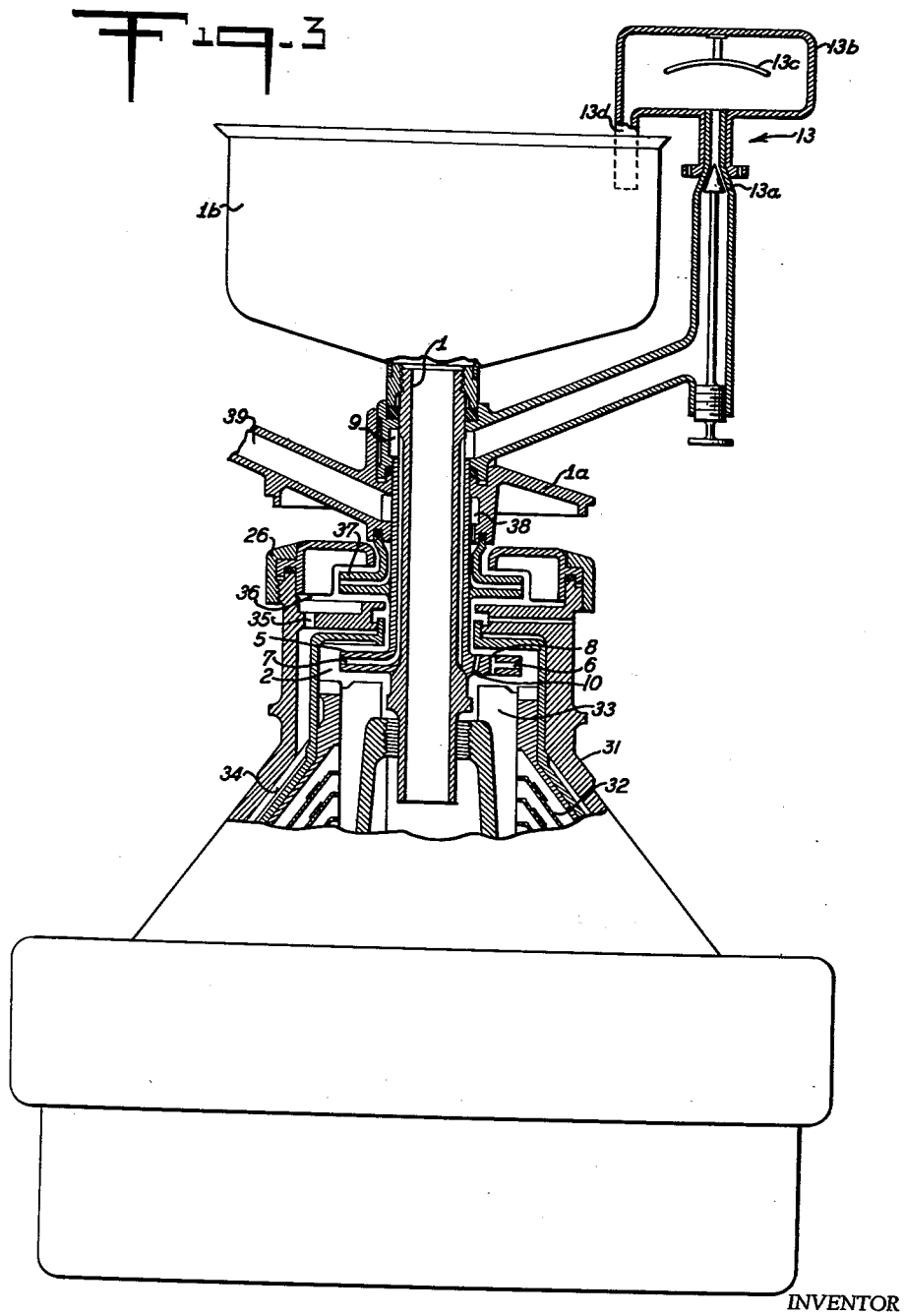

Feb. 26, 1963 W. WILSMAN 3,079,133
DEVICE FOR THE MIXING AND HOMOGENIZING OF LIQUID COMPOSITIONS
Filed May 1, 1958 3 Sheets-Sheet 3
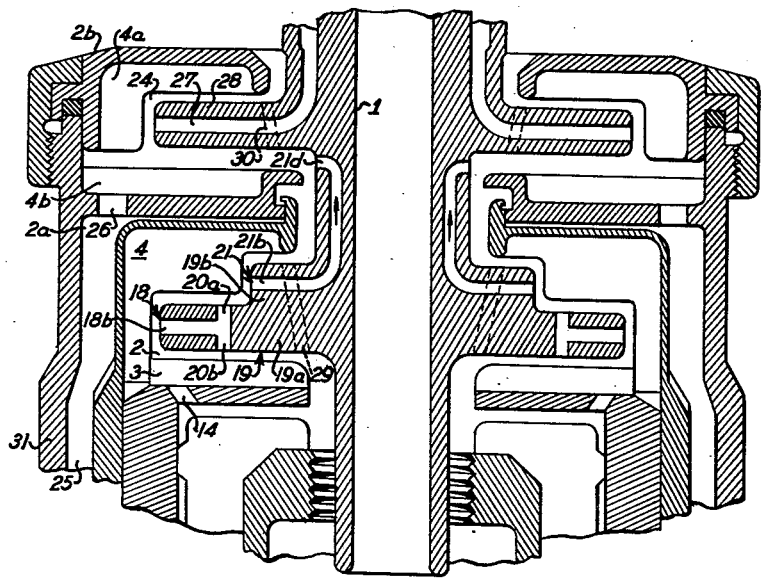
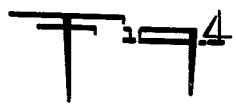
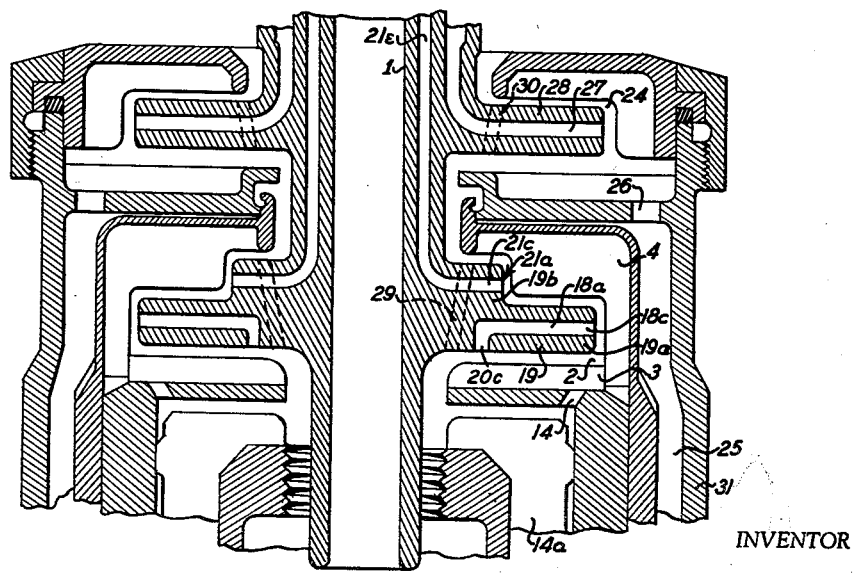
INVENTOR
WILHELM WILSMAN
BY
ATTORNEYS

United States Patent Office 3,079,133
Patented Feb. 26, 1963

3,079,133
DEVICE FOR THE MIXING AND HOMOGENIZING
OF LIQUID COMPOSITIONS
Wilhelm Wilsman, Oelde, Westphalia, Germany, assignor to Westphalia Separator A.G., Westphalia, Germany
Filed May 1, 1958, Ser. No. 732,303
Claims priority, application Germany May 22, 1957
15 Claims. (Cl. 259—3)

This invention relates to the mixing and homogenizing of liquid compositions.

The invention was occasioned by the need for an improved means for homogenizing milk, and accordingly, it will be described with reference to this service.

The purpose of the homogenizing of milk is to comminute fat globules which are suspended in the milk serum (whey) to such an extent that noticeable creaming no longer takes place in 48 hours under the action of gravity. The uniform distribution of the milk fat by homogenizing the whole milk by special homogenizing machines requires, however, a very high expenditure of energy since the entire quantity of milk must be pressed through narrow slits or nozzles under pressures of up to 300 atmospheres gauge. For this reason, for a long time partial homogenization has been employed, which consists in breaking down the whole milk in a centrifuge bowl into cream and skim milk, homogenizing merely the cream and thereupon mixing it again with the skim milk. The milk, standardized to the fat content, is subjected, at the end of the dairy treatment, to a recognized heating process.

However, the homogenizing of the cream by homogenizing machines also requires a relatively high amount of energy. In order to make the known homogenizing machines dispensable, the liquid pressure in the centrifuge bowl or the delivery pressure of the collector disk produced upon the collecting of the cream has already been used to force the cream through nozzles or slits and mix it again with the feed of whole milk. Upon repeated passage through the centrifuge mill, larger fat globules are separated and again forced through the homogenizing device and are divided. If an independent homogenizing device set up outside the centrifuge is employed, a homogenized whole milk can be obtained which emerges from the bowl via the skim-milk outlet.

There are also known collector disks in connection with which there are provided in the collecting channels cyclones or eddy chambers which have the job of breaking down the fat globules. The cream is subjected to relatively gentle treatment in these devices so that no extensive splitting up of the fat globules is obtained.

The present invention relates to a collector disk for the mixing and homogenizing of liquids, particularly milk. It is based on the idea of allowing at least a part of the collector channels to discharge again into the same collector chamber, centrifuging the cream taken up by these channels under the delivery pressure produced against the rapidly rotating driving blades of the collector chamber and subjecting it repeatedly to this homogenizing treatment. This circulation of the cream can take place in a single collector chamber. If, however, a plurality of collector chambers are provided one behind the other, all the collector channels can lead from one chamber to the next. In this case specially calibrated openings in the peripheral part of the collector chamber walls can in addition produce a communicating connection between the chambers. In this way, the portion of the cream consisting of small fat globules which cannot be thrown out and which does not require any further homogenization treatment, passes directly into the next collector chamber and thus relieves the collector disk.

The present invention relates to the effecting of homogenization of liquid compositions, particularly milk, in a collector chamber. The invention is based on the idea of providing the collector disk with circulation channels arranged so that they receive liquid composition being centrifuged in the collector chamber and discharge it into the path of the rapidly rotating ribs or blades provided to impart rotary motion to the liquid composition present in the collector chamber. The liquid composition impinges against the ribs and a homogenization results from this impinging.

Various devices according to the invention are shown in the accompanying drawings. The embodiments of the invention, as set forth in the drawings, are intended merely to illustrate the invention and are not intended to set forth limitations of the invention. In the drawings:

FIG. 3 is an elevation view, partially in cross-section, of a centrifugal separator provided with a collector chamber according to the invention;

FIG. 4 is an elevation view, in cross-section of a portion of a collector chamber according to the invention;

FIG. 5 is an elevation view, in cross-section, of a portion of a collector chamber according to the invention; and In the drawings, like reference characters in different views refer to corresponding parts.

Figure 1:
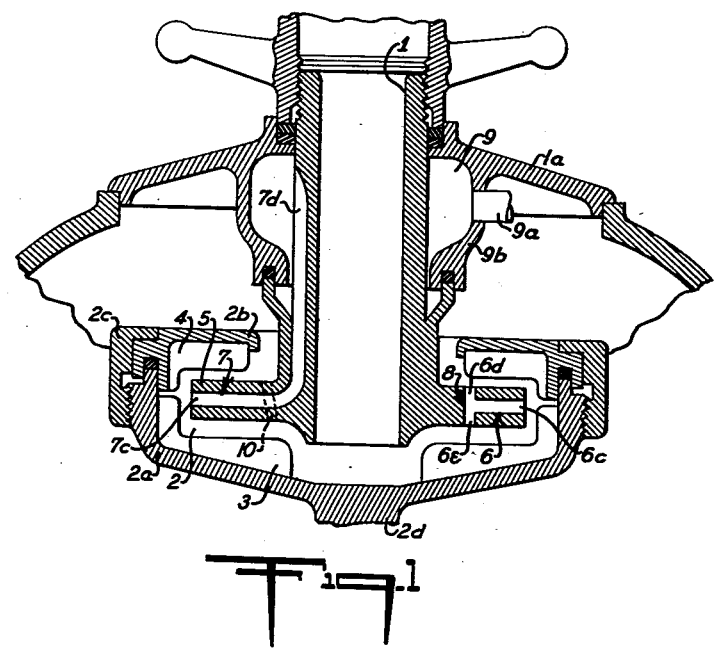
FIG. 1 is an elevation view, in cross-section, of a collector chamber according to the invention.

In FIG. 1 of the drawing, there is shown a device for mixing and homogenizing liquid compositions which includes a collector chamber 2 formed by cylindrical-shaped vessel 2a and the inwardly projecting collar 2b which is secured to the vessel 2a by union nut 2c. The collector chamber is rotatably mounted so as to permit centrifuging liquid compositions present therein. In the drawing the collector chamber is mounted on a shaft 2d which is operatively connected to drive means (not shown) suitable to impart the desired rotary motion to the collector chamber. Fixedly secured within the collector chamber are lower ribs 3 and upper ribs 4 which extend radially and axially of the collector chamber and function to impart rotary motion to liquid composition present in the chamber, and also to assist in mixing and homogenization in a manner shortly to be described. Also positioned within the collector chamber, but disconnected therefrom, is a collector disk 5 which is integrally joined to inlet chamber 1 provided as means for introducing liquid composition into the collector chamber 2 and which in turn is fixedly secured to frame 1a. The collector disk 5 includes deflection channel 7, which extends through the disk from inlet 7c disposed along the outer periphery of the disk 5 to outlet 7d, which opens into annular channel 9 formed by skirt 9b which depends from frame 1a and the adjacent surface of the inlet channel 1. A vent 10 extends through the disk 5 and provides pressure equalization for the mixing and homogenizing device. The deflecting channel 7 is formed in a manner well known in the art so as to receive liquid composition being centrifuged in the collector chamber and conduct it to without the chamber, for example to annular chamber 9.

According to the invention the collector disk includes a circulation channel 6 which extends through the disk from inlet 6c, disposed at the outer periphery of the disk, to outlets 6e and 6d, which are disposed at opposite ends of the axially extending portion 8 of the circulating channel 6. The radially extending portion of the circulation channel 6 is advantageously formed in the manner in which radially extending portions of the collector disk deflection channels are formed, and the function of the circulation channel is to receive liquid composition which is being centrifuged in the collector chamber at a relatively larger distance from the centrifuging axis, convey it through the disk and discharge it a relatively shorter distance from the centrifuging axis into the collector chamber. Thus, energy of the liquid composition due to the centrifuging can be converted into pressure. The resulting pressure is employed to effect homogenization. According to the invention, the mixing and homogenizing device includes means which employ the pressure of the liquid composition to effect homogenization thereof. The homogenizing means can be nozzles positioned in the outlets of the circulation channel 6 or other means disposed in the path of liquid composition circulated in the circulation channel. Advantageously, the ribs 3 and/or 4 can be employed as the homogenizing means. To operate in this manner, the ribs and circulation channel can be arranged, as is shown in FIG. 1, so that liquid composition circulated through said circulation channels is discharged therefrom into the path of the ribs which are rotating rapidly and are impinged by the liquid composition, thus causing homogenization thereof.

In operation of the device shown in FIG. 1, liquid composition introduced into feed inlet 1 passes to collector chamber 2, where it is centrifuged and a portion of the liquid composition is circulated through circulation channel 6, while another portion is withdrawn from the collector chamber by deflection channel 7. The deflection channel passes the composition to annular chamber 9 and the composition discharges from this chamber through outlet 9a. When the unit is employed to homogenize cream, the discharge from the annular channel can be combined with skim milk or, alternatively, can be treated in a centrifugal separator to separate a fraction suitable for combining with skim milk and a lighter fraction which can be returned to the homogenizing unit of the invention for further treatment.

While in FIG. 1 but one circulation channel and one deflection channel are shown, in general a plurality of each of the circulation channels and the deflection channels will be provided. The same is true of other embodiments set forth in the drawings. The homogenizing effect is increased by increasing the number of circulation channels.

Figure 2:
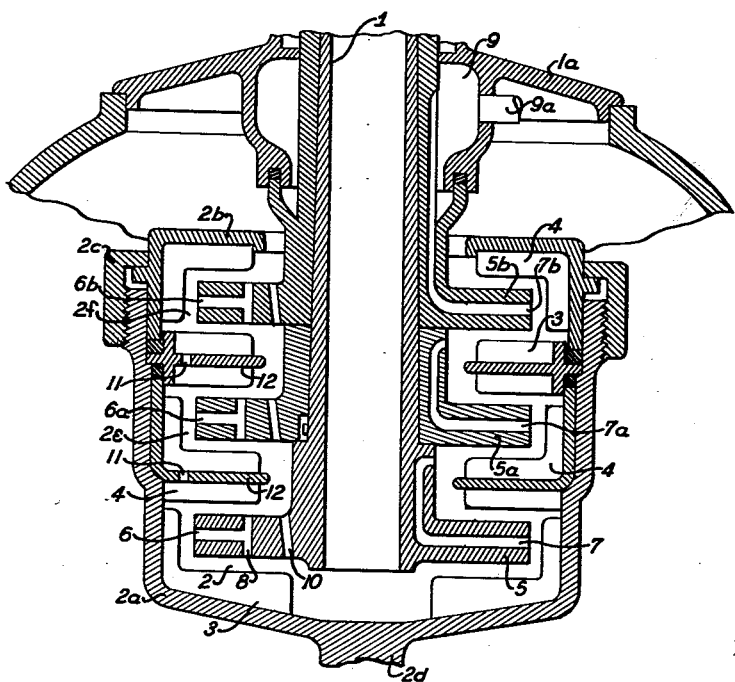
FIG. 2 is an elevation view, in cross-section, of a device according to the invention and including a plurality of collector chambers.

In FIG. 2 there is shown an embodiment of the invention wherein three collector chambers 2, 2e and 2f are employed. These collector chambers are mounted in self-superposed relationship and so that each collector chamber operates in a manner generally similar to the operation of the collector chamber shown in FIG. 1. Liquid composition introduced through feed inlet 1 passes to the lowermost collector chamber 2, where it is centrifuged, a portion of the composition being circulated through circulation channel 6 and another portion being received by deflection channel 7. The deflection channel 7 passes the composition to the next collector chamber 2e which operates in a manner similar to the manner of collector chamber 2, homogenizing and passing liquid composition on to the uppermost collector chamber 2f, through deflection channel 7a. It may be desirable to construct deflection channels 7a and 7b so that their cross-sectional area is changeable. From the uppermost chamber the composition is passed to annular channel 9 and discharges from the device through the outlet 9a. A feature of this embodiment of the invention is the provision of passageways 11 in the partitions 12 which separate the collector chambers. These passageways are disposed radially outwardly of the circulation channel inlets, so that when cream, for example, is being treated, the portion of the cream consisting of small fat globules which cannot be thrown out and which do not require further homogenization treatment, pass directly into the next collector chamber. Thus, the peripherally positioned openings 11 relieve load on the collector disks. Advantageously, the passageways 11 can be calibrated so as to give optimum performance. In the instant embodiment, depending on the nature of the material being treated, a part or all of the material can be allowed to pass over the inner edge of the partition walls 12 into the next chamber.

In FIG. 3 there is shown a homogenizing device according to the invention in combination with a centrifuge. Liquid composition is fed into feed bowl 1b and passes through feed channel 1 to the centrifuge bowl 31. In the centrifuge disk set 32 effects a separation of a specifically lighter fraction, which flows through passageway 33 to collector chamber 2, and a specifically heavier fraction which flows through passageway 34 and then through opening 35 and into collector chamber 36. Collector disk 37 which is positioned in collector chamber 36, removes the specifically heavier fraction deposited in this chamber and passes it to annular chamber 38, from where the specifically heavier fraction discharges through line 39. In collector chamber 2 homogenization of the specifically lighter fraction is effected in a manner generally similar to the manner in which homogenization is effected in the collector chamber shown in FIG. 1, and the specifically lighter fraction is removed from the collector chamber by deflection channel 7, which passes the composition to annular chamber 9, from where the composition discharges through outlet 9a. Outlet 9a conducts materials subjected to homogenizing treatment in collector chamber 5 to auxiliary homogenizing device 13. The material passes through nozzle 13a and flows into vessel 13b where it impinges against baffle 13c. From the vessel 13b the material flows through discharge line 13d and drops into the centrifuge feed tank 1b. In this manner of operation wherein additional homogenizing means are employed, material can be treated so that all of the material is recovered as specifically heavier fraction.

By suitable rearrangement of the operating parts of the device shown in FIG. 3, this device could be employed to homogenize the specifically heavier fraction and to pass as product, the specifically lighter fraction.

In FIG. 4 and FIG. 5 there are shown devices according to the invention suitable for use in combination with centrifuges. Referring to these figures, a specifically heavier fraction from the centrifuge passes through passageways 25 and openings 26 and on into collector chamber 24, wherein there is operatively positioned collector disk 28. The deflection channel 27 of collector disk 28 receives a specifically heavier fraction in the collector chamber 24 and discharges it from the collector chamber. The specifically lighter fraction from the centrifuge passes through passageway 14a and then through opening 14, from where it issues into collector chamber 2, which has coaxially mounted therein collector disk 19. Collector disk 19 has a body portion 19a and an upper portion 19b, the upper portion being of smaller diameter than the body portion. Extending through the upper portion 19b of the disk for receiving at the other periphery of the upper portion, the specifically lighter fraction being centrifuged in the collector chamber 2 and conducting the fraction to without the collector chamber, is a deflection channel which is indicated by reference numeral 21 in FIG. 4 and 21a in FIG. 5.

In the embodiment shown in FIG. 4, the collector disk 19 includes a circulation channel 18 which extends from inlet 18b, disposed at the outer periphery of the disk lower portion 19a, radially inwardly to the axially extending portion 20b of the circulation channel, and the axially extending portion 20b terminates at outlets 20a. The deflecting channel 21 of collector disk 19 extends through the upper portion 19b of the disk from inlet 21b to outlet 21d, arranged so that material conveyed through the deflection channel 21 will be discharged into collector channel 24 which also receives the specifically heavier fraction. A feature of the embodiment shown in FIG. 4 is the relationship of the various inlets and outlets associated with collector chamber 2. Thus, instead of the inlets to the deflection channel and the circulation channel being located at the same radial distance from the centrifuging axis, as is the case for the embodiment shown in FIG. 1 for example, the inlet 21b of deflection channel 21 is disposed radially inwardly of inlet 18b of circulation channel 18. It is desirable to have the inlet to the circulation channel remotely positioned from the centrifuging axis, as this arrangement results in high pressures being obtainable for homogenization. Also, the outlets 20a of the circulation channel 18 are disposed radially outwardly of the inlet to the deflection channel 21 so that the circulation channel discharges material radially outward of the inlet 21b of deflection channel 21. Additionally, inlet 14 to collector chamber 2 is positioned below the collector disk 19 and is disposed relative to the inlet 21b of deflection channel 21 so that undesirable by-passing of the homogenizing treatment is unlikely.

Also with reference to the embodiment shown in FIG. 4, it will be noted that material from a centrifuge is passed to a collector chamber 2, where it is subjected to a homogenizing treatment, and is thereafter passed to the collector chamber 24 where it is combined with other material which passes directly from the centrifuge to the collector chamber 24.

Referring to FIG. 5, the arrangement of the various inlets and outlets associated with the collector chamber 2 differs from the arrangement shown in FIG. 4. Thus, the circulating channel 18a has a single outlet 20c and this outlet is disposed on the lower surface of the collector disk 19, and is positioned radially inwardly of inlet 21c of deflection channel 21a. Also, deflection channel 21a extends to outlet 21e and does not discharge into collector chamber 24.

A feature of the embodiment of FIG. 5 is that the circulation channel has a single outlet 20c and this outlet is disposed in the lower surface of the collector disk 19. This arrangement assures thorough homogenizing treatment of material in the collector chamber 2 before the material is removed from the chamber by deflection channel 21a. An additional feature of this embodiment is that outlet 20c of the circulation channel 18a is disposed radially inwardly of inlet 21c of deflection channel 21a.

I claim:

1. A device for mixing and homogenizing liquid compositions comprising a collector chamber, a collector disk positioned within said chamber, means for introducing liquid composition into said chamber and means for centrifuging liquid composition contained therein, said collector disk having separate means for receiving and discharging homogenized liquid composition to without the collector chamber including separate means defining a circulation channel having an inlet and at least one outlet and extending through the disk for receiving liquid composition being centrifuged in the collector chamber at a given distance from the centrifuging axis, conveying it through the disk and discharging it a relatively shorter distance from the centrifuging axis than said given distance into said chamber whereby at least part of the liquid in the collector chamber is discharged again into said collector chamber and energy of liquid composition due to centrifuging is converted into pressure, and homogenizing means disposed in the path of liquid composition circulated in said circulation channel for imparting to the liquid a rotary motion and employing pressure of the liquid composition in the circulation channel to effect homogenization thereof.

2. A device for mixing and homogenizing liquid compositions comprising a rotatably mounted collector chamber having radially and axially extending ribs positioned therein, a collector disk positioned within said chamber, means for introducing liquid composition into said chamber, means for rotating said chamber for centrifuging liquid composition contained therein, said collector disk having separate means for receiving and discharging homogenized liquid composition to without the collector chamber including separate means defining a circulation channel having an inlet and at least one outlet and extending through the disk for receiving liquid composition being centrifuged in the collector chamber at a given distance from the centrifuging axis, conveying it through the disk and discharging it a relatively shorter distance from the centrifuging axis than said given distance into said chamber and into the path of said ribs whereby at least part of the liquid composition can be recirculated in said chamber and impinged against said ribs employing the energy of said liquid to produce the pressure required to effect said homogenization.

3. A device according to claim 2, said separate means for receiving and discharging homogenized liquid composition to without the collector chamber including means defining a deflection channel having an inlet and an outlet and extending through the disk for receiving part of the liquid composition being centrifuged in the collector chamber and conducting it to without the collector chamber, the circulation channel inlet being disposed radially outwardly of the deflection channel inlet.

4. A device for homogenizing liquid compositions comprising a rotatably mounted collector chamber having radially and axially extending ribs positioned therein, a collector disk having a body portion and an upper portion, the upper portion being of smaller diameter than the body portion, said collector disk being coaxially mounted in said collector chamber, means for introducing liquid composition into said chamber, means for rotating said chamber for centrifuging liquid composition contained therein, said collector disk including separate means defining a circulation channel having an inlet and an outlet and extending through the body portion of said disk for receiving at the outer periphery of the disk part of the liquid composition being centrifuged, conveying it radially inwardly through the disk and discharging it into said chamber, said collector disk further including separate means defining a deflecting channel having an inlet and an outlet and extending through the upper portion of said disk for receiving at the outer periphery of the upper portion part of the liquid composition being centrifuged and conducting it to without the collector chamber.

5. A device according to claim 4, the means to introduce liquid composition being disposed below the disk body portion, and the circulating channel having only one outlet, said one outlet being disposed in the lower side of the disk body portion.

6. A device according to claim 5, the said one circulating channel outlet being disposed radially inwardly of the deflecting channel inlet.

7. A device for mixing and homogenizing liquid compositions comprising two collector chambers mounted in self-superposed relationship, means for centrifuging liquid composition contained in said chambers, a collector disk mounted within each of said chambers, the collector disk mounted in each chamber including separate means defining a circulation channel having an inlet and at least one outlet extending through the disk for receiving part of the liquid composition being centrifuged at a given distance from the centrifuging axis, conveying it through the disk and discharging it a relatively shorter distance from the centrifuging axis than said given distance into the chamber in which the disk is mounted whereby energy of liquid composition is converted into pressure, each chamber further including homogenizing means disposed in the path of liquid composition circulated through its circulation channel for employing the energy of the liquid composition in the circulation channel to produce the pressure required to effect homogenization of the liquid composition, means for introducing liquid composition into one of said chambers, the disk mounted in the said chamber having separate means for introduction of liquid composition including means defining a deflecting channel having an inlet and an outlet extending through the disk for receiving part of the liquid composition being centrifuged and conducting it to the other of said collector chambers, the collector disk in the other of said collector chambers having separate means for receiving and discharging homogenized liquid composition to without said other of said collector chambers, and means defining a passageway between said chambers disposed outwardly of the circulation channel inlet of the disk disposed in the said chamber having means for introduction of liquid thereinto.

8. In a centrifuge for separating a liquid composition into a specifically lighter fraction and a specifically heavier fraction, having means for introducing liquid composition into said centrifuge and means for removing one of said fractions from the centrifuge the improvement which comprises, means for homogenizing treatment of the other of said fractions, the homogenizing treating means comprising a collector chamber mounted for rotation with the centrifuge, a collector disk positioned within said chamber, means for introducing fractions to be subjected to the homogenizing treatment into said chamber, said collector disk having separate means for receiving and discharging homogenized liquid composition to without the collector chamber and including separate means defining a circulation channel having an inlet and at least one outlet and extending through the disk for receiving at least part of the liquid composition being centrifuged in the collector chamber at a given distance from the centrifuging axis, conveying it through the disk and discharging it a relatively shorter distance from the centrifuging axis than said given distance into said chamber whereby energy of liquid composition due to centrifuging can be converted into pressure, and homogenizing means disposed in the path of liquid composition circulated in said circulation channel for employing pressure of the liquid composition in the circulation channel to effect homogenization thereof.

9. A device according to claim 8, in which said separate means for receiving and discharging homogenized liquid composition to without the collector chamber includes means defining a deflection channel having an inlet and an outlet and extending through the disk for receiving liquid composition being centrifuged in the collector chamber and conducting it to without the collector chamber, and means for returning the liquid composition conducted to without the collector chamber by the deflecting channel to the means for introducing liquid composition into said centrifuge.

10. A device according to claim 8, in which the said separate means for receiving and discharging homogenized liquid composition to without the collector chamber includes means defining a deflection channel having an inlet and outlet extending through the disk for receiving liquid composition being centrifuged in the collector chamber and conducting it to without the collector chamber and additional homogenizing means for homogenizing liquid composition conducted to without the collector chamber by the deflecting channel, and means for conducting liquid composition treated by said additional homogenizing means to said means for introducing liquid composition into said centrifuge.

11. A device according to claim 8, in which said means for removing said one of said fractions includes a second collector chamber, and the separate means for discharging homogenized liquid composition to without the collector chamber of the collector disk employed for homogenization treatment of the other of said fractions includes a deflection channel which passes the said other fraction from the collector chamber in which it is subjected to homogenizing treatment to the second of said collector chambers.

12. A device according to claim 2, said separate means for receiving and discharging homogenized liquid composition to without the collector chamber including means defining a deflection channel having an inlet and an outlet and extending through the disk for receiving part of the liquid composition being centrifuged in the collector chamber and conducting it to without the collector chamber, the inlet to the circulation channel and the inlet to the deflection channel being at the same radial distance from the centrifuging axis.

13. A device according to claim 2, said separate means for receiving and discharging homogenized liquid composition to without the collector chamber including means defining a deflection channel having an inlet and an outlet and extending through the disk for receiving part of the liquid composition being centrifuged in the collector chamber and conducting it to without the collector chamber, the circulation channel outlet being disposed radially outwardly of the deflection channel inlet.

14. A device according to claim 2, said separate means for receiving and discharging homogenized liquid composition to without the collector chamber including means defining a deflection channel having an inlet and an outlet and extending through the disk for receiving part of the liquid composition being centrifuged in the collector chamber and conducting it to without the collector chamber, the circulation channel outlet being disposed radially inwardly of the deflection channel inlet.

15. A collector disk for paring liquid composition from a rotating centrifuge chamber which comprises means defining a central axial portion and a peripheral flange portion radially outwardly extending from said axial portion, separate paring discharge conduit means extending from a discharge inlet defined in said flange portion to a dicharge outlet defined in said axial portion, and separate paring circulation conduit means extending from a circulation inlet defined in said flange portion to a circulation outlet defined in said flange portion radially inwardly of said circulation inlet.

References Cited in the file of this patent

UNITED STATES PATENTS

| 2,125,453 | Lindgren | Aug. 2, 1938 |
| 2,144,229 | Ruda | Jan. 17, 1939 |
| 2,195,730 | Lindgren | Apr. 2, 1940 |
| 2,197,991 | Andersson | Apr. 23, 1940 |
| 2,344,888 | Lindgren | Mar. 21, 1944 |
| 2,612,356 | Borck | Sept. 30, 1953 |
| 2,673,075 | Borck | Mar. 23, 1954 |
| 2,705,620 | Borck | Apr. 5, 1955 |

FOREIGN PATENTS

| 479,007 | Great Britain | Jan. 28, 1938 |